US012138643B2

(12) United States Patent
Yang

(10) Patent No.: US 12,138,643 B2
(45) Date of Patent: Nov. 12, 2024

(54) SELF-SEALING PUMP AND METHODS OF MANUFACTURE AND USE THEREOF

(71) Applicant: Suzhou Gerpman Industrial Co., Ltd., Taicang (CN)

(72) Inventor: Yu Yang, Taicang (CN)

(73) Assignee: SUZHOU GERPMAN INDUSTRIAL CO., LTD., Taicang (CN)

( * ) Notice: Subject to any disclaimer, the term of this patent is extended or adjusted under 35 U.S.C. 154(b) by 144 days.

(21) Appl. No.: 17/971,349

(22) Filed: Oct. 21, 2022

(65) Prior Publication Data

US 2023/0131081 A1 Apr. 27, 2023

Related U.S. Application Data

(60) Provisional application No. 63/388,231, filed on Jul. 11, 2022.

(30) Foreign Application Priority Data

Oct. 27, 2021 (CN) ......................... 202122591658.2

(51) Int. Cl.
*B05B 11/10* (2023.01)
*F04B 7/00* (2006.01)

(52) U.S. Cl.
CPC ........ *B05B 11/1042* (2023.01); *F04B 7/0088* (2013.01)

(58) Field of Classification Search
CPC ............. B05B 11/1042; B05B 11/1023; B05B 11/1047; B05B 11/1053; B05B 11/1074; F04B 7/0088
See application file for complete search history.

(56) References Cited

U.S. PATENT DOCUMENTS 4,249,681 A * 2/1981 French ................ B05B 11/1074 239/533.13
5,779,106 A * 7/1998 Albini ................. B05B 11/1094 239/570
7,172,098 B2 2/2007 Garcia
(Continued)

FOREIGN PATENT DOCUMENTS

JP 2002166202 A * 6/2002 ......... B05B 11/3053
JP 3812716 B2 8/2006
WO 2012074315 A2 6/2012

OTHER PUBLICATIONS

European Search Report for European Patent Application No. 22203761.6, mailed Mar. 7, 2023, 9 pages.

*Primary Examiner* — Vishal Pancholi
(74) *Attorney, Agent, or Firm* — Lowenstein Sandler LLP

(57) ABSTRACT

Disclosed are self-sealing actuators and pumps for distributing fluids such as personal care products. The actuator can include a nozzle having an outlet that is opens and closes via movement of a plug. A limit rod is configured to engage with the plug and upon actuation the assembly opens a passage for the fluid to flow through an inner channel of the limit rod and to the outlet. Upon de-actuation, the assembly closes the passage sealing the fluid within a closed environment to prevent degradation and caking. Actuators and pumps as described protect the performance of active ingredients within the fluid and prevent the nozzle and outlet from blocking with dried or caked fluid.

14 Claims, 6 Drawing Sheets

(56) References Cited

U.S. PATENT DOCUMENTS

| | | | | |
|---|---|---|---|---|
| 2005/0230436 | A1* | 10/2005 | Marroncles | B65D 83/753<br>222/402.13 |
| 2009/0272765 | A1 | 11/2009 | Seki | |
| 2019/0240687 | A1* | 8/2019 | Lee | B05B 11/105 |

* cited by examiner

SELF-SEALING PUMP AND METHODS OF MANUFACTURE AND USE THEREOF

FIELD

The disclosure relates to a self-sealing pump suitable for use in packaging fluids (e.g., cosmetics and personal hygiene products).

BACKGROUND

Societal developments and gradual improvements in quality of life, have encouraged consumers to demand heightened requirements for the quality of fluids (e.g., cosmetics, personal care products, etc.) to be applied to their skin and bodies. Consumers want such fluids to maintain potency without degradation of various ingredients (e.g., the active ingredients, vitamins, etc.). Maintaining the ratio of ingredients within such fluids is also desirable to maintain the quality of the fluids. Liquid or viscous fluids such as liquid foundation, shampoo, and other cosmetics and personal care compositions are typically administered using a manual press discharge pump, which requires consumers to repeatedly press down on an external head to draw fluid into a pipe and through a discharge channel. Most discharge channels of such pumps are open to the atmosphere such that the contents within the channel come into contact with air, in particular, oxygen. In many instances, high-end active ingredients deteriorate in the presence of oxygen and/or the fluid itself dries out after prolonged contact with gas impacting long-term storage of the fluid. At the same time, the contents at the discharge nozzle of such manual press discharge pumps are not easy to dispense, which can result in contamination of the discharge nozzle.

BRIEF SUMMARY

According to various embodiments, disclosed herein is a self-sealing pressing and discharging actuator, which is fixedly connected to a pump body assembly and comprises a use state as a directional reference, the actuator comprising an actuator body (1) with a discharge cavity (11) inside; a nozzle (2) connecting the discharge cavity with an external atmosphere is connected to a side end surface of the actuator body; a plug (3) positioned in the discharge cavity (11), wherein an end of the pump body assembly is connected to a limit rod (4), a central axis of which is perpendicular to a central axis of the plug (3), wherein the limit rod (4) is communication with an inside of the pump body assembly and an inside of the nozzle, wherein an end of the limit rod (4) is slidingly connected to a tapered surface of plug (3) enabling the plug (3) to elastically stretch and slide along an axial direction of the nozzle (2), and wherein the plug (3) has an avoidance state for opening the nozzle (2) and a blocking state for closing the nozzle (2). In some embodiments, a spring (5) is positioned between the end of plug (3) and an end wall of the discharge cavity (11), the spring (5) being against a tail end of plug (3) and can make the plug move in the axial direction. One or more fluid guiding grooves may be arranged in the axial direction are formed on a circumferential surface of plug (3) close to one end of nozzle (2), wherein the one or more fluid guiding grooves are collected near the outlet end of nozzle (2), wherein at least one clamping rib (21) arranged in the axial direction is formed on the circumferential surface of nozzle (2), and the clamping rib (21) is clamped in the fluid guiding grooves to limit a circumferential position of the nozzle (2). According to one or more embodiments, a middle section of plug (3) corresponding to limit rod (4) is formed with a connection comprising the discharge cavity (11), wherein a tapered groove (32) is formed on a tapered groove (32) of plug (3) with a first tapered surface (32*a*) and a first stop surface (32*b*), wherein the limit rod (4) is formed at the corresponding tapered groove and there is a tapered plane protrusion (41) connecting the inside of the limit rod (4) and an outside of limit rod (4), and wherein a second tapered plane (41*a*) and a second stop surface (41*b*) are formed on the tapered plane protrusion, and wherein the first tapered plane is along a first plane, the two tapered surfaces being slidably matched such that the first stop surface stops at the second stop surface, so that the blocking has an avoidance state. The limit rod (4) may comprise a rod body (42) coaxial with the actuator body (1) and passes through both ends of the actuator body (1), the shaped end portion (41) being fixedly formed on a top of the rod body, and a discharge hole (41*c*) communicating with the inside of the rod body being open at the bottom of the shaped end portion (41). In some embodiments, a stop plate (43) is formed radially outwardly extending from the middle second and a lower section of the limit rod (4), a flange (44) arranged in the axial direction fixed on the outer peripheral wall of the limit rod (4) above the stop plate (43), and the actuator body (1) can move up and down along the flange (44) and stop at the stop plate (43) at a baffle. An inner annular wall (12) may be formed on the actuator body (1) and is located below the discharge cavity (11) in the axial direction of the actuator body (1), a guide groove (13) being provided on the inner annular wall (12) corresponding to flange (44) in the axial direction, and the flange (44) is slidably fitted in the guide groove. According to one or more embodiments, the limit rod (4) is inserted in the inner annular wall (12) at the upper section above stop plate (43), and wherein an inner channel of an inner ring is sealed with an inner surface of the inner annular wall (43) via a sealing ring (6).

According to further embodiments, disclosed herein is a push pump comprising the actuator as described above.

In yet further embodiments, disclosed herein is a self-sealing pump, comprising: an actuator comprising: a nozzle configured to attach to an actuator body, the actuator body comprising at least one inner annular wall extending radially inward from the actuator body, wherein the inner annular wall defines a discharge cavity; a plug configured to slidingly seat within the nozzle and the discharge cavity, wherein the plug comprises a first end having one or more fluid guiding grooves and a second end comprising a protrusion, the plug further comprising a mid-section having a tapered groove; a spring configured to coaxially mate with the protrusion and to seat against an internal surface of the actuator body; a limit rod comprising a shaped end portion configured to slidingly engage with the tapered groove, wherein the limit rod is configured to extend through the inner annular wall, the limit rod further comprising an inner channel in communication with the discharge cavity via a discharge hole positioned within the shaped end; a sealing ring configured to form a seal between the limit rod and the inner annular wall; and a stop plate attached to and extending radially outward from the limit rod, the stop plate received within the actuator housing; and a reservoir, wherein the actuator is removably attached to the reservoir, wherein, upon actuation, the actuator is configured to move in a first direction perpendicularly to the nozzle, which opens a passage from the reservoir through the inner channel and discharge hole into the discharge cavity along the one or more fluid guiding grooves and through an outlet of the nozzle, and upon de-actuation, the actuator is configured to close the passage. According to one or more embodiments, movement of the limit rod within the tapered groove slides the plug in an axial direction upon actuation and de-actuation. The one or more fluid guiding grooves may be arranged in the axial direction of the plug and are formed on a circumferential surface of the plug proximate an outlet of the nozzle. In some embodiments, the self-sealing pump may further comprise at least one clamping rib arranged in an axial direction of the plug and formed on a circumferential surface of the nozzle, wherein the clamping rib is configured to claim in the one or more fluid guiding grooves to limit circumferential movement of the nozzle. The tapered groove can include a first tapered surface and a first stop surface and the shaped end of the limit rod comprises a second tapered surface and a second stop surface, and wherein the first tapered surface and the second tapered surface are configured to slidably contact such that the first stop surface is configured to stop at the second stop surface to open the inner channel to the discharge cavity. According to one or more embodiments, the self-sealing pump further includes a flange extending radially outward from the limit rod, the flange being positioned above the stop plate, wherein the actuator body is configured to move up and down along the flange and to stop at the stop plate. The inner annular wall may comprise a guide groove configured to slidably engage with the flange. In some embodiments, the nozzle further comprises an outlet in communication with the discharge cavity via the one or more fluid guiding grooves. The spring may be positioned such that, upon actuation, movement of the plug compresses the spring against the internal surface and opens the outlet, and upon de-actuation, the spring elongates to move the plug back to the nozzle thereby blocking the outlet. According to various embodiments, one or more of the nozzle, actuator body, at least one inner annular wall, plug, spring, limit rod, sealing ring, stop plate or reservoir comprises a metal, plastic, ceramic or combination of two or more thereof. In one or more embodiments, one or more of the nozzle, actuator body, at least one inner annular wall, plug, spring, limit rod, sealing ring, stop plate or reservoir comprises a sustainable material selected from the group consisting of a biodegradable polymer, polyethylene, polypropylene, ethylene vinyl alcohol, nylon or combinations of two or more thereof. The reservoir can include a fluid selected from the group consisting of a liquid, slurry, viscous liquid, paste, Bingham plastic, cosmetic, dentifrice, household cleaner, personal care product, moisturizer, sun screen, serum, cream, lotion, gel, lip color, lip moisturizer, lip gloss, blush, foundation, liquid foundation, shampoo, conditioner, eyeliner, eye shadow, deodorant, antiperspirant, perfume, surface cleaner, wood cleaner, glass cleaner, metal cleaner, stone cleaner, wood moisturizer, surface disinfectant, surface duster, surface fragrance, an oil, an alcohol and combinations of any two or more thereof.

BRIEF SUMMARY OF THE SEVERAL VIEWS OF DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DEFINITIONS

Figure 1:
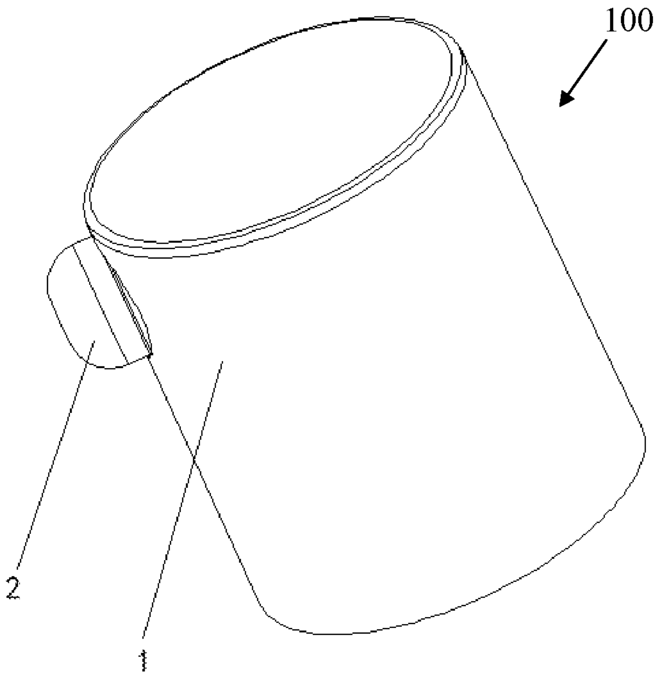
FIG. 1 is self-sealing pump according to embodiments of the disclosure.

Reference throughout this specification to, for example, "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the singular forms "a," "an," and "the" include plural references unless the context clearly indicates otherwise. Thus, for example, reference to "a lift pin" includes a single lift pin as well as more than one lift pin.

As used herein, the term "about" in connection with a measured quantity, refers to the normal variations in that measured quantity as expected by one of ordinary skill in the art in making the measurement and exercising a level of care commensurate with the objective of measurement and the precision of the measuring equipment. In certain embodiments, the term "about" includes the recited number±10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Unless otherwise indicated, all parts and percentages are by weight. Weight percent (wt. %), if not otherwise indicated, is based on an entire composition free of any volatiles, that is, based on dry solids content.

The term "cosmetic" as used herein refers to an article that may be as defined under the Federal Food, Drug, and Cosmetic act (FD&C Act) by its intended use, as "articles intended to be rubbed, poured, sprinkled, or sprayed on, introduced into, or otherwise applied to the human body . . . for cleansing, beautifying, promoting attractiveness, or altering the appearance." FD&C Act, § 201(i). Products included in this definition may include, but are not limited to, skin moisturizers, lotions, serums, perfumes, lipsticks, fingernail polishes, eye and facial makeup preparations, cleansing shampoos, permanents, hair colors, and deodorants, as well as any substance intended for use as a component of a cosmetic product.

DETAILED DESCRIPTION

In order to solve the above-mentioned technical problems, the disclosure provides a self-sealing pump configured to discharge a fluid upon actuation of an actuator element and to automatically seal upon release of the actuator element. Self-sealing pumps according to embodiments herein can protect the effectiveness of contents stored therein for a longer time period as compared to conventional manual press discharge pumps. The self-sealing pumps also ensure the discharge nozzle seals and remains free and clear of dried and caked fluid. Self-sealing pumps according to embodiments herein prevent the fluid stored therein from degrading and becoming polluted, in order to achieve different use effects and the effect of airtight preservation. Self-sealing pumps according to embodiments herein include an actuator that upon actuation (e.g., pressing down on the actuator body) opens a discharge passage allowing fluid to flow to a nozzle of the self-sealing pump.

Embodiments of a technical scheme for operating a self-sealing pump according to embodiments herein include actuating an actuator element (e.g., pressing on a button) that is fixedly connected to a pump body assembly. This use state directs fluid toward the nozzle and outlet. According to various embodiments, the self-sealing pump includes an actuator body with a discharge cavity inside. A side end surface of the actuator body is coupled to a nozzle in communication with the discharge cavity. A plug may be seated within the discharge cavity in the actuator body and configured to open and close a passageway from the discharge cavity and the nozzle. An end of a pump body assembly may be fixedly connected with a limit rod, the center axis of which is perpendicular to the center axis of the plug. The pump body assembly may be in communication with the nozzle via the limit rod. In some embodiments, the limit rod includes a rod body that is coaxial with the actuator body and passes through both ends. The limit rod may include a discharge hole configured to receive fluid from a discharge channel within the limit rod. The end of the limit rod can be slidingly engaged with a tapered portion of the plug so that the plug can elastically stretch and slide along an axial direction of the nozzle to open and close the passageway within the nozzle.

In some embodiments, the self-sealing pump includes a spring positioned between an end of the plug and a side wall of the discharge cavity. According to various embodiments, the spring may at a first end contact, abut, slide over, engage, etc. an end of the plug and at a second end may contact, abut, engage, etc. the side wall of the discharge cavity. According to embodiments, the spring is configured to move the plug toward and away from the nozzle in an axial direction.

In some embodiments, the plug may include at least one fluid guiding groove arranged along a portion of the plug in the axial direction. The at least one fluid guiding groove may be formed on a circumferential surface of the plug closest to the nozzle. At least one rib arranged in an axial direction of the nozzle may be formed on an internal surface thereof. The at least one rib is configured to engage with at least one corresponding groove on the surface of the plug to limit the circumferential position and/or rotation of the nozzle.

In one or more embodiments, a mid-section portion of the plug includes an opening, notch, groove, etc. (referred to herein as a "plug opening") configured to engage with a corresponding shaped end portion of the limit rod. In some embodiments, the plug opening may be a tapered groove that communicates with the discharge cavity. The tapered groove of the plug may contain a first tapered surface having a first slope and a first stop surface. The shaped end portion of the limit rod may be tapered and configured to seat in the tapered groove. The tapered groove can be formed with a shaped end portion configured to connect the inside of the limit rod and the outside of the limit rod. A second tapered surface and a second stop surface are formed on the shaped end portion. The first tapered surface slidably moves along the second tapered surface such that the first stop surface stops at the second stop surface creating an open state of the plug with respect to the nozzle.

According to one or more embodiments, a stop plate is formed at the middle and/or lower sections of the limit rod and extends radially outward. A plug arranged in the axial direction is fixed on the outer peripheral wall of the limit rod above the stop plate. The actuator body is configured to move up and down along the plug and to stop at the stop plate.

In some embodiments, the actuator body includes an inner annular wall. According to some embodiments, the inner annular wall is formed below the discharge cavity in the axial direction of the actuator body. A guide groove arranged along the axial direction is provided on the inner annular wall corresponding to the plug, and the plug is configured to engage with and/or slide in the guide groove. The limit rod may be received within an inner channel formed by the inner annular wall. In some embodiments, the limit rod is received within the inner channel formed at an upper section of the inner annular wall above the stop plate. The limit rod may be sealedly connected with the inner surface of the inner annular wall through a sealing ring.

In some embodiments, a self-sealing pump assembly includes a reservoir to which the self-sealing pump attaches. The reservoir may be configured to store fluid for dispensing by the self-sealing pump. In some embodiments, the self-sealing pump is connected, attached, threaded onto or otherwise affixed to the reservoir.

According to various embodiments, the actuator of the self-sealing pump as described herein utilizes engagement and/or cooperation between the plug (e.g., the tapered groove) and the limit rod (e.g., the shaped end portion), to move the plug away from the nozzle to open the discharge passage. Such movement of the plug may be downward, backward and/or in the axial direction toward and/or against the spring, for example, thereby compressing the spring. Upon actuation (e.g., by pressing down on the actuator body), fluid may flow out from an opening in the nozzle. This configuration of the actuator limits contact of the fluid and active ingredients with the atmosphere (e.g., including oxygen) resulting in better fluid performance, less degradation of ingredients and better stability while at the same time preventing dried and caked fluid from blocking or polluting the nozzle.

In one or more embodiments, the limit rod of the actuator is hollow (e.g., includes a discharge passageway therethrough) and configured to communicate with the actuator body and discharge cavity. This configuration of the actuator enables the fluid to smoothly enter the nozzle from the pump body while at the same time enabling the actuator body to be adjusted. In some embodiments, movement of the actuator may have a press down limit.

Self-Sealing Pumps

Embodiments of self-sealing pumps according to the disclosure will be described with respect to the drawings. In some embodiments, the drawings depict an actuator configured to seal the fluid to be dispensed from the external environment. The actuator itself may be actuated by pressing, which opens a discharge passage to the nozzle. The actuator can be removably connected to a pump body assembly. As will be described in more detail, the pump body assembly may be fixedly connected to a collar via a fixing ring. The collar may be threadedly connected to a fluid reservoir (e.g., a container) using a threaded structure of the fluid reservoir. The coupling of the actuator to the reservoir can form a closed environment to seal the fluid to be dispensed therein, protecting the fluid from degradation by the external environment and drying and caking.

An embodiment of an actuator 100 for a self-sealing pump is shown in FIG. 1. Actuator 100 is formed of an actuator body 1. A nozzle 2 may be connected and/or attached to the actuator body 1 as shown in FIG. 1. In some embodiments, nozzle 2 is configured to pass through and/or seat in an opening of the actuator body 1.

Figure 2:
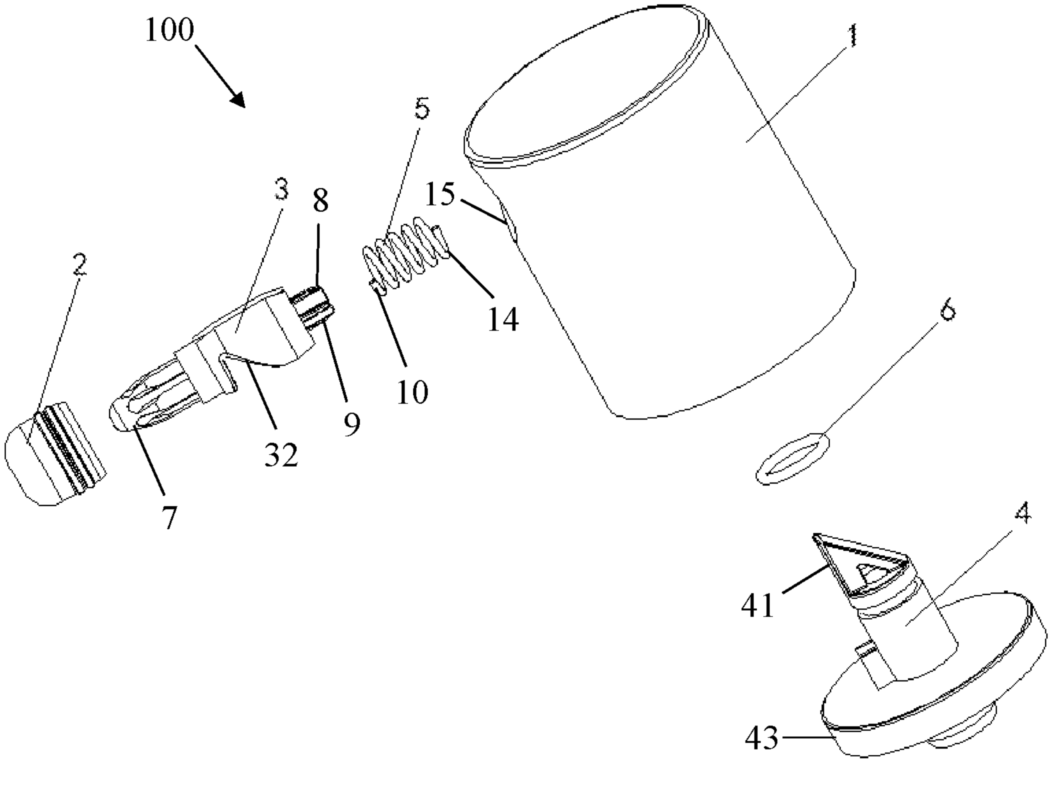
FIG. 2 is an exploded view of a self-sealing pump according to an embodiment of the disclosure.

An exploded view of the actuator 100 is shown in FIG. 2. Actuator 100 may further include a plug 3 having a first end 7 configured to seat and/or engage with nozzle 2. Plug 3 is at least partially or completely housed within the interior of actuator body 1. A second end 8 of plug 3 is configured to contact a spring 5. In some embodiments, spring 5 is formed of a metal material, for example, stainless steel, and optionally may be coated with a flexible plastic such as a polyethylene oxide, perfluoroalkoxy, polycarbonate, acrylic, acrylonitrile butadiene styrene, or other suitable polymer. In some embodiments, the second end 8 of plug 3 includes a cylindrical protrusion 9 over which spring 5 can slide. A first end 10 of spring 5 may seat on plug 3 and a second end 14 of spring 5 seats on an interior of actuator body 1 as will be described in more detail.

Actuator 100 may further include a limit rod 4 having a shaped end portion 41 configured to engage with a tapered groove 3 of plug 3. Limit rod 4 may be connected to a stop plate 43, which will be described in more detail below. Limit rod 4 is configured to be received in a sealing ring 6, which seals the limit rod within the interior of the actuator body 1.

Figure 3:
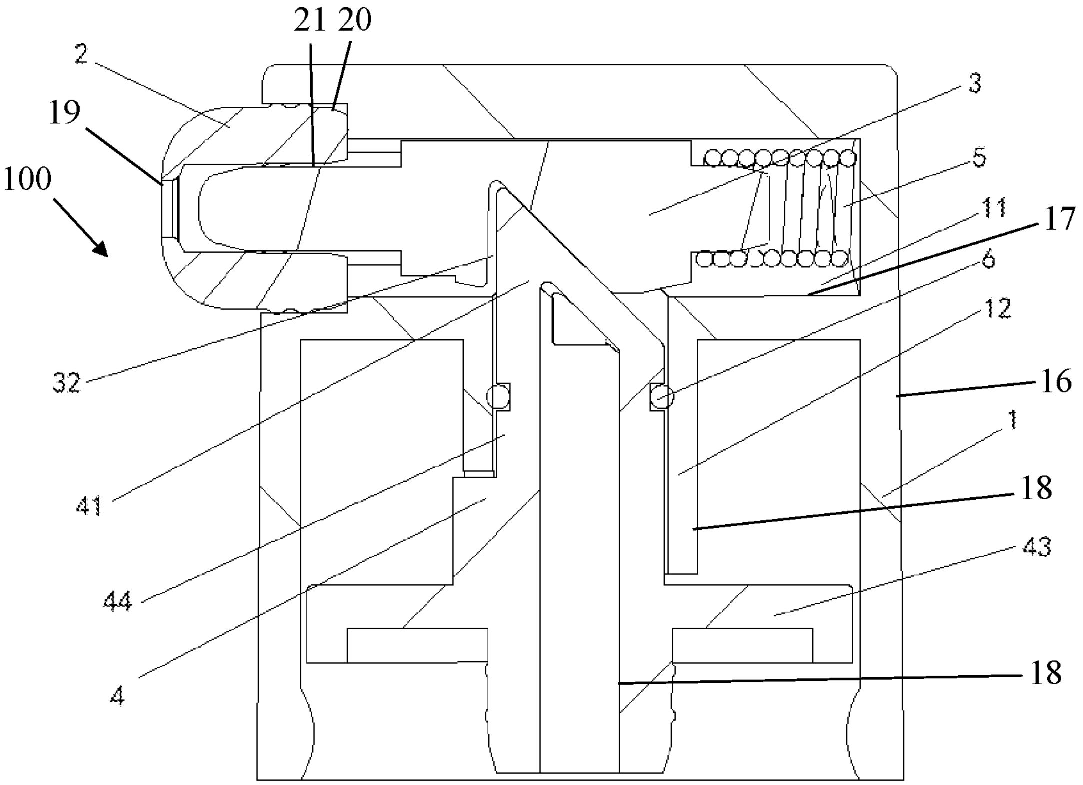
FIG. 3 is a sectional view of a schematic diagram of an actuator of a self-sealing pump in a compressed state according to an embodiment of the disclosure.
Figure 4:
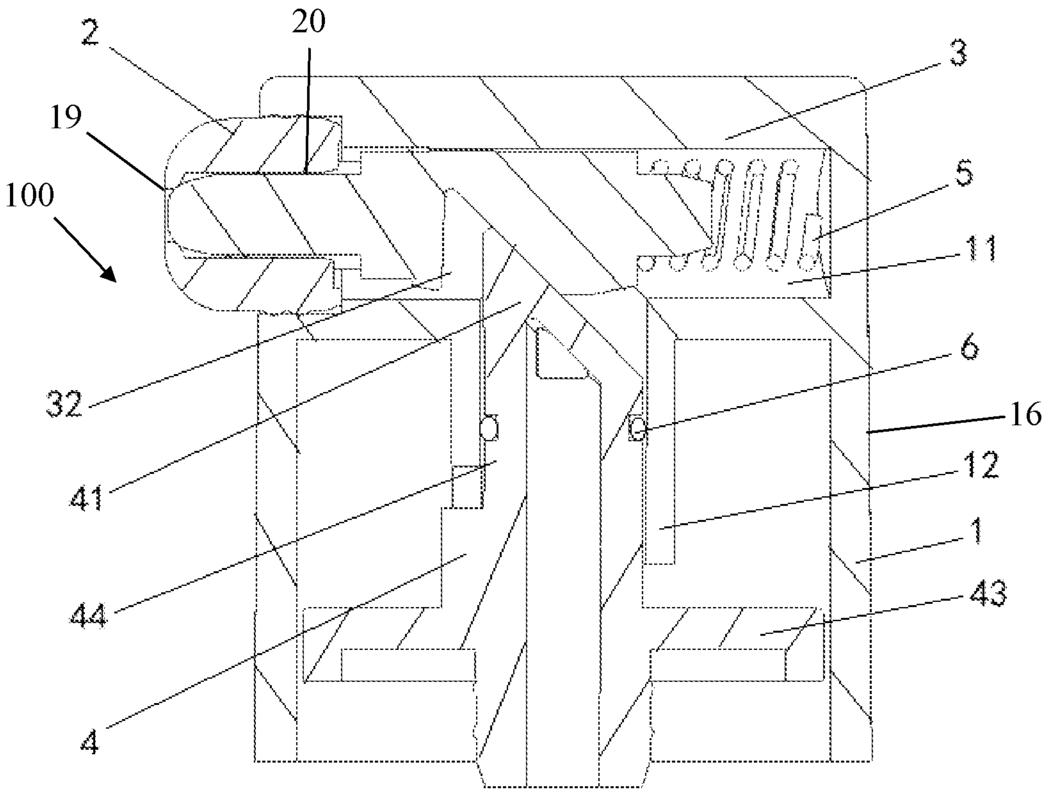
FIG. 4 is a sectional view of a schematic diagram of an actuator of a self-sealing pump in an uncompressed stated according to an embodiment of the disclosure.
Figure 5:
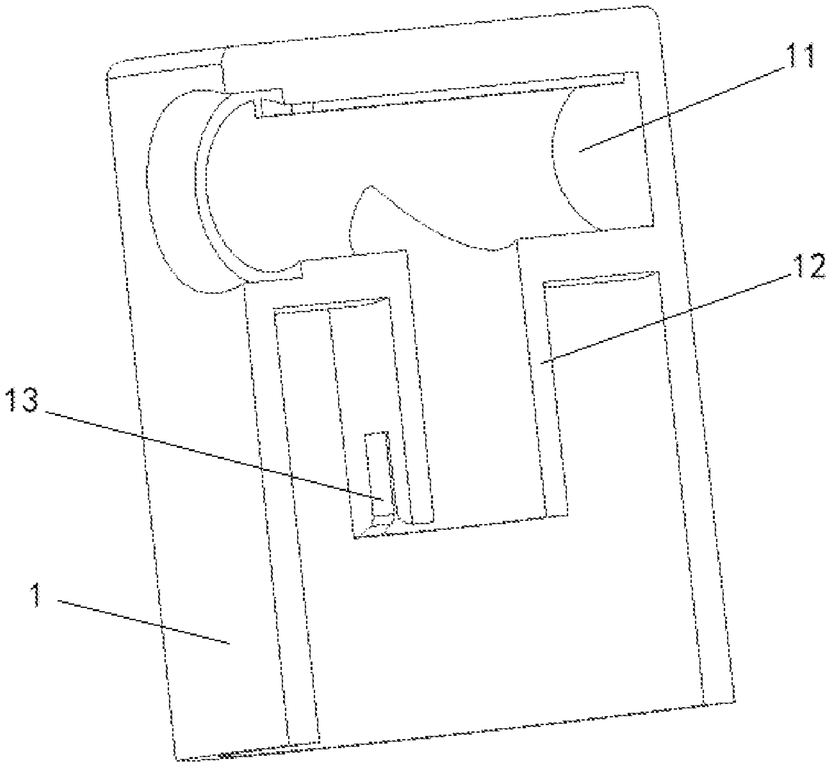
FIG. 5 is a sectional view of a schematic diagram of an actuator body of an actuator for a self-sealing pump according to an embodiment of the disclosure.

As shown in FIGS. 3-5, actuator body 1 may be divided into upper and lower sections. The upper section includes a discharge cavity 11 arranged in the interior of the actuator body 1 in a transverse direction (i.e., arranged in a radial direction). Actuator body 1 includes an opening 15 in which nozzle 2 may be seated, fixed, attached and/or inserted. In some embodiments, nozzle 2 and an inner wall of discharge cavity 11 can be fixedly connected by a snap ring, or other connector suitable for attaching nozzle 2 and the inner wall. The lower section of actuator body 1 may be located below discharge cavity 11. As shown in FIGS. 3-5, an inner annular wall 12 is formed along the axial direction of the actuator body 1. Inner annular wall 12 forms a base 17 of discharge cavity 11 as well as an internal wall 18 through which limit rod 4 may be arranged and sealed. In some embodiments, the height of inner annular wall 12 is less than the height of the outer peripheral wall 16 of the actuator body 1.

According to one or more embodiments, nozzle 2 is configured with an open end that forms an outlet 19 and a constricted end 20. The end face of the constricted end 20 can have a spherical structure, and a discharge port 22 may be formed at the constriction through which nozzle 2 is connected to discharge cavity 11 and the external environment. Fluid may flow from the discharge cavity 11 through the discharge port 22 and to outlet 19.

Figure 8:
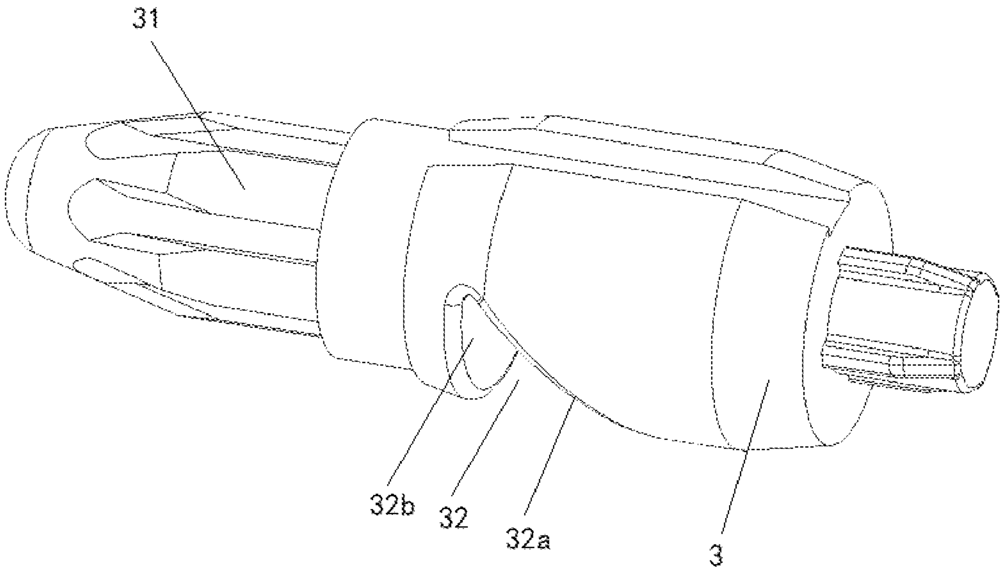
FIG. 8 is a schematic diagram of a plug for a self-sealing pump according to an embodiment of the disclosure.

In some embodiments, plug 3 is positioned in the discharge cavity 11 of actuator body 1. Plug 3 may be viewed as containing three sections: the first end section 7, the mid-section 23 and the second end section 8 in order from the direction of the nozzle. As shown in FIGS. 2 and 8, one or more fluid guiding grooves 31, arranged in the axial direction, are formed on the circumferential surface of the first end 7 of plug 3 proximate nozzle 2. Fluid guiding grooves 31 form one or more flow channels between an outer peripheral wall of nozzle 2 and an inner peripheral wall of nozzle 2. The fluid guiding grooves 31 and flow channels are configured to guide the fluid to collect at outlet 19 of nozzle 2 providing a smooth discharge flow of the fluid.

Figure 6:
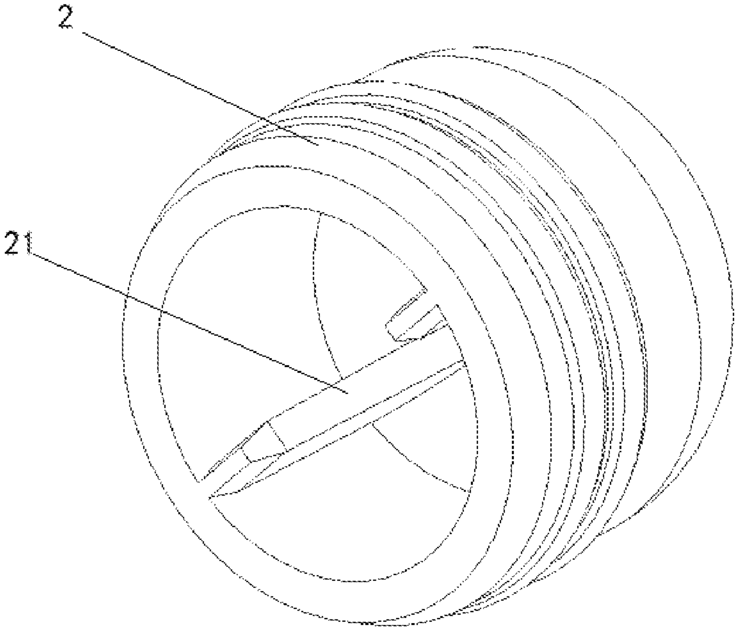
FIG. 6 is a structural schematic diagram of a nozzle for a self-sealing pump according to an embodiment of the disclosure.
Figure 7:
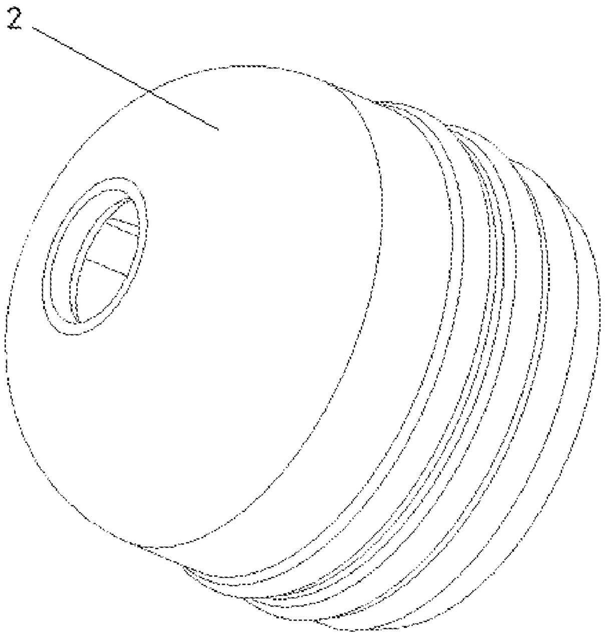
FIG. 7 is a structural schematic diagram of a nozzle for a self-sealing pump according to an embodiment of the disclosure.

In some embodiments, nozzle 2 includes at least one clamping rib 21 arranged along the axial direction and formed on the inner circumferential surface as shown in FIG. 6. In the embodiment shown in FIG. 6, nozzle 2 includes two symmetrically arranged clamping ribs 21. The at least one rib 21 is configured to engage with at least one corresponding groove on the surface of plug 3 to limit the circumferential position and/or rotation of nozzle 2.

As shown in FIGS. 3 and 4, a spring 5 is positioned between the second end 8 of plug 3 away from nozzle 2 and an inner side of the end wall 24 of discharge cavity 11. In some embodiments, plug 3 includes a protrusion 9 at the second end of plug 3. Protrusion 9 can have a width or diameter smaller than the width or diameter of mid-section 23. In this way, the resilience and restoring force of spring 5 can reset plug 3 upon de-actuation of actuator body 1.

As further shown in FIGS. 3 and 4, limit rod 4 has a center axis perpendicular to the center axis of plug 3. In some embodiments, limit rod 4 is fixedly connected to the end of pump body assembly 300, such that limit rod 4 communicates with the inside of pump body assembly 300 and the inside of nozzle 2. The shaped end portion 41 of limit rod 4 may be slidably matched or engaged with the plug 3 so that plug 3 can elastically stretch and/or slide along the axial direction of nozzle 2. Plug 3 is configured two move from one end pot another: an open state, which unblocks the discharge passage to nozzle 2 and outlet 19; and a closed state, which blocks the discharge passage to nozzle 2 and outlet 19. Actuation of the actuator body 1, for example, by pressing down, causes plug 3 to move in the axial direction toward spring 5 thereby opening a passage from the discharge cavity 11 to nozzle 2 and outlet 19. In some embodiments, partial actuation, for example, pressing down only slightly on actuator body 1, causes plug 3 to move correspondingly slightly opening the discharge passage part-way and causing less fluid to dispense from outlet 19 than during a complete actuation. De-actuation of actuator body 1, for example, removing all force, causes plug 3 to move axially toward nozzle 2 and outlet 19 with assistance from the decompression, expansion, bias and/or stored energy of spring 5.

Figure 9:
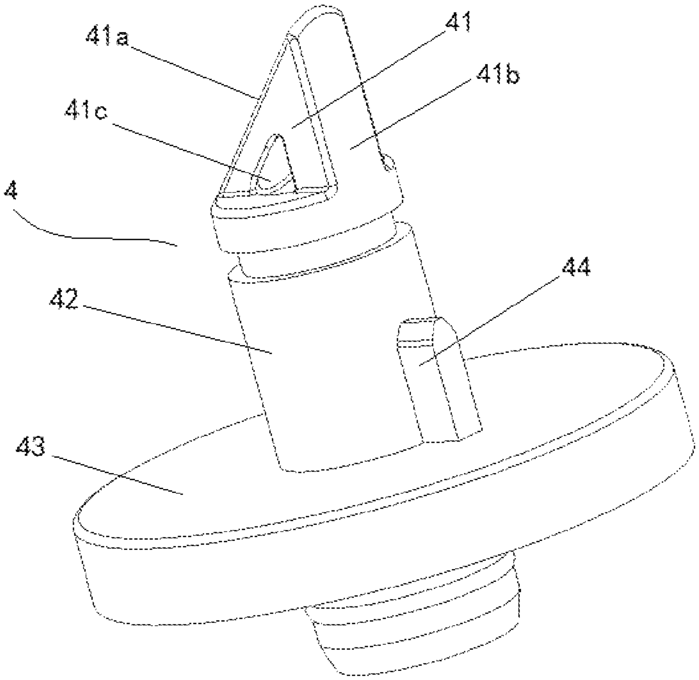
FIG. 9 is a structural representation of a limit rod for a self-sealing pump according to an embodiment of the disclosure.

In some embodiments, plug 3 includes a tapered groove 32 formed in mid-section 23. Tapered groove 32 may be in communication with discharge cavity 11 as shown in FIGS. 3 and 4. Tapered groove 32 of plug 3 is configured to receive, cooperate and/or engage with the shaped end portion 41 of limit rod 4. As shown in FIGS. 2-5 and 8, tapered groove 32 may include a first sloped surface 32*a* and a first stop surface 32*b* that correspond to tapered surfaces of shaped end portion 41 of limit rod 4. As shown in FIGS. 4 and 9, the shaped end portion 41 of limit rod 4 can include a second sloped surface 41*a* and a second stop surface 41*b* that correspond to the first loped surface 32*a* and first stop surface 32*b* of plug 3. The second sloped surface 41*a* may slidably engage with first stop surface 32*b* and is configured to stop at the second stop surface 41*b*, to effect an open state of plug 3.

As shown in FIG. 9, limit rod 4 in the above structure includes a rod body 42 that is arranged coaxially with actuator body 1 and passes through both ends as shown in FIGS. 3 and 4. Shaped end portion 41 may be fixedly formed on top of rod body 42. Limit rod 4 further includes an internal discharge channel 41*d* arranged along its central axis. Shaped end portion 41 may be provided with a discharge hole 41*c* in communication with discharge channel 41*d*. Upon actuation of actuator 100, fluid travels through discharge channel 41*d* and discharge hole 41*c* into discharge cavity 11. Plug 3 moves axially against spring 5 opening a passage to outlet 19 of nozzle 2 as described above.

As shown in FIG. 9, stop plate 43 formed at the middle and lower sections of limit rod 4 extends radially outward therefrom. A flange 44 may be fixed on an outer peripheral wall of limit rod 4 above stop plate 43. Actuator body 1 is configured to move up and down along flange 44 and to stop at stop plate 43. In some embodiments, an inner annular wall 12 is formed on the actuator body 1 below the discharge cavity 11 along the axial direction of the actuator body. As shown in FIG. 5, inner annular wall 12 is provided with guide groove 13 arranged along the axial direction corresponding to flange 44. Flange 44 is configured to slide or otherwise engage with guide groove 13. According to various embodiments, limit rod 4 is configured for insertion within an inner channel formed by inner annular wall 12. The inner channel of inner annular wall 12 is formed at an upper section of limit rod 4 above stop plate 43. The inner channel may be sealedly connected with an inner surface of the inner annular wall 12 via sealing ring 6.

When actuator 100 is not actuated (i.e., pressed), plug 3 is seated against outlet 19 at the front end of nozzle 2 under action of the spring 5 force. This places actuator 100 in a closed state. When actuator 100 is actuated (e.g., pressed), actuator body 1 moves downward to drive plug 3 in an axial direction toward spring 5 opening outlet 19 to discharge cavity 11. First slope surface 32*a* of plug 3 slides downward along second slope surface 41*a* of limit rod 4, driving plug 3 to move backward and compress spring 5. The front end of plug 4 moves away from outlet 19 of nozzle 2 opening a passage from discharge cavity 11 to nozzle 2 and outlet 19. In this way, nozzle 2 is open in the pressed state, and nozzle 2 is closed in the unpressed state, which can better protect the performance of active ingredients in the fluid and prevent the nozzle from being polluted.

Figure 10:
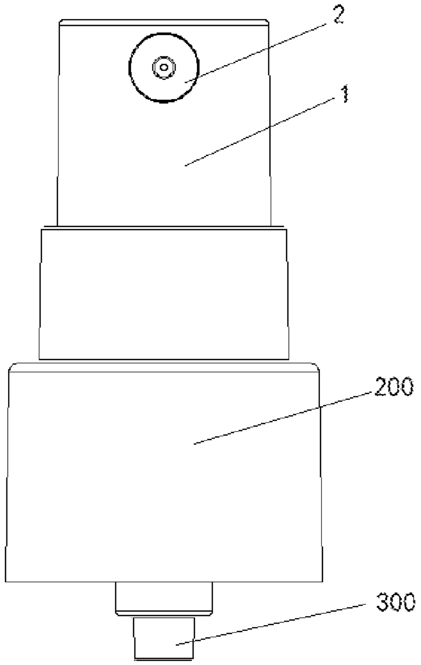
FIG. 10 is a schematic diagram of an overall structure of a self-sealing pump according to an embodiment of the disclosure.
Figure 11:
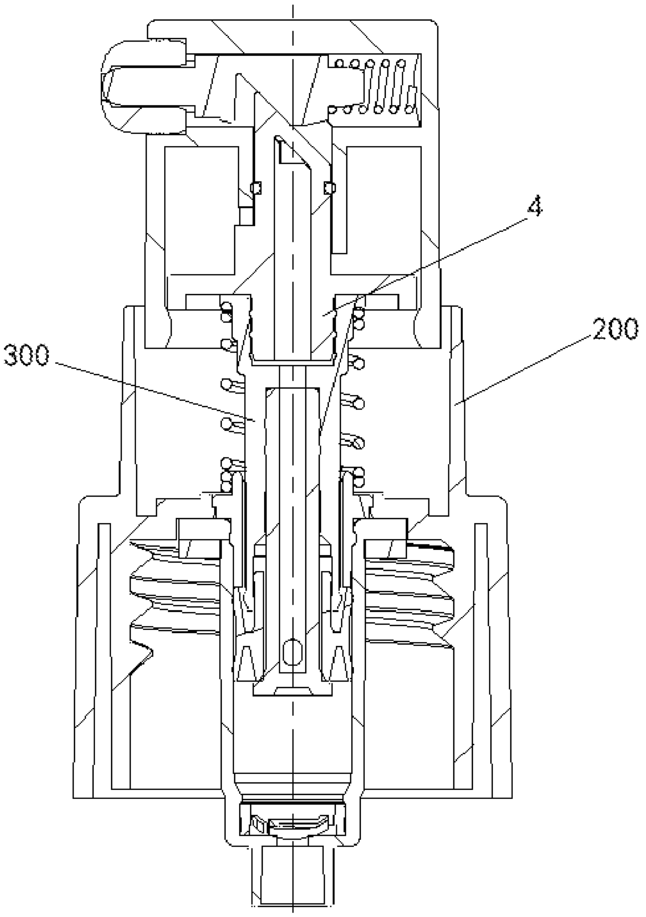
FIG. 11 is a schematic cross-sectional view of a schematic diagram of a self-sealing pump according to an embodiment of the disclosure.

An embodiment of a self-sealing pump assembly is shown in FIGS. 10 and 11. The self-sealing pump assembly includes an actuator as described above, for example, actuator 100. The actuator includes an actuator body 1 and nozzle 2 as shown in FIGS. 10 and 11. The self-sealing pump assembly can include a collar 200 and a pump body assembly 300. The actuator may be connected to an end of a connecting rod in the pump body assembly 300 through the bottom of the limit rod. In some embodiments, pump body assembly 300 passes through a fixing ring that may be fixedly connected to a cap. The self-sealing pump assembly may be removably connected to a reservoir (not shown), for example, via threaded connection. The reservoir is configured to contain and store a fluid to be dispensed. Suitable reservoirs include, but are not limited to, bottles, vials, pouches, jars and balloons. In some embodiments, extending from the base of the actuator 100 is a tube configured to draw fluid from a fluid source. For example, the fluid source may be contained within a reservoir removably attached to the actuator. The tube may be removably attached to the actuator.

Components of self-sealing pumps as described herein may be formed of a variety of materials, including, but not limited to plastics, metals, ceramics or combinations of two or more thereof. In some embodiments, the components are formed of sustainable materials. Sustainable materials suitable for components of the self-sealing pump (e.g., actuator body, plug, spring, nozzle, o-rings, etc.) according to embodiments herein include, but are not limited to, flexible materials, biodegradable polymers, polymers, polyethylene (PE), polypropylene (PP), ethylene vinyl alcohol (EVOH), nylon and combinations thereof. In some embodiments, the components can be constructed of materials in mono-layers, multi-layers and/or in blends of materials to provide a complete range of flexibility and protective barrier. In some embodiments, the materials suitable for the components include, but are not limited to, polyethylene in various blends and/or having various molecular weights. According to one or more embodiments, polyethylene utilized for materials of components can have a molecular weight of about 1,000 Da to about 10,000,000 Da, about 2,000 Da to about 8,000,000 Da, about 5,000 Da to about 5,000,000 Da, about 10,000 Da to about 1,000,000, about 20,000 Da to about 800,000 Da, about 50,000 Da to about 500,000 Da or any individual molecular weight or sub-range within these ranges as measured using American Society for Testing and Materials (ASTM) D6474 or ASTM D6474-20.

In one or more embodiments, the sustainable material is a biodegradable polymer, a recycled composition or a combination thereof. For example, the actuator body 1, nozzle 2, plug 3, limit rod 4, spring 5, sealing ring 6 and associated components each may be constructed of at least one of a biodegradable polymer or a recycled composition such as a recycled resin. For example, biodegradable plastics can be used, i.e., plastics meeting ASTM D6400-04 Standard Specification for Compostable Plastics. Desirably, a biodegradable plastic is fully biodegradable, and is not merely fragmented into very small particles upon biodegradation. An example of such fully biodegradable plastic can be polyhydroxyalkanoate (PHA) materials.

Methods of Manufacture

According to various embodiments, components of actuators and self-sealing pumps as described herein, can be manufactured using any suitable methods known to those of ordinary skill in the art. In some embodiments, components of the actuators and self-sealing pumps can be manufactured using three-dimensional printing, injection-molding, extrusion and combinations thereof. Manufacturing techniques such as assembly line construction can be used to assemble the components of the actuators and self-sealing pumps.

In some embodiments, the components of the actuators and self-sealing pumps as described herein may be injection molded. Injection molding includes molding a molten plastic composition, under pressure, into an intended shape. The resulting injection molded pieces are configured to, for example, snap together without the use of any additional mechanical component such as a mechanical fastener or adhesive. In embodiments, cosmetic dispensers as disclosed herein may be constructed of four (4) injection molded components and free of adhesive and/or a mechanical fastener including, but not limited to, a screw, bolt, hinge and/or combinations thereof.

In some embodiments, a method of preparing an actuator or self-sealing pump as described herein includes using injection molding to form the various components. In some embodiments, the components may be injection molded at a temperature of about 50° C. to about 400° C. and/or a pressure of about 20 MPa to about 200 MPa. The material properties of hardness, density, porosity, tensile strength and roughness may be maintained for the materials presented herein. In some embodiments, the components may be extrusion molded at a temperature of about 130° C. to about 250° C.

Methods of Use

Self-sealing pumps according to embodiments herein are suitable for use to dispense fluids. Fluids suitable for being dispensed using self-sealing pumps as described herein include, but are not limited to, liquids, slurries, viscous liquids, pastes, Bingham plastics, etc. In one or more embodiments, suitable fluids may be configured to be rubbed, introduced into, or otherwise applied to a surface. In some embodiments, the surface is, for example, skin or teeth and the fluid is applied, for example, to cleanse, whiten, beautify, promote attractiveness, and/or alter appearance. In some embodiments, the surface is, for example, an inanimate surface and the fluid is applied, for example, to clean, polish, moisturize, deodorize, disinfect, dust, etc.

Suitable fluids include, but are not limited to, cosmetics, dentifrices and household cleaners. Suitable cosmetics include, but are not limited to, a cosmetic, moisturizer, sun screen, serum, cream, lotion, gel, lip color, lip moisturizer, lip gloss, blush, foundation, eyeliner, eye shadow, deodorant, antiperspirant and/or perfume. Suitable household cleaners include, but are not limited to, surface cleaners, wood cleaners, glass cleaners, metal cleaners, stone cleaners, wood moisturizers, surface disinfectant, surface dusters, surface fragrances and/or combinations thereof.

Although exemplary systems have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

One having ordinary skill in the art will appreciate that the size, shape and placement of such structures can be varied depending on the particular application. Apart from the functional aspects the structures provide, they also provide a novel decorative element. One having ordinary skill in the art will appreciate the decorative possibilities such shapes present.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

As used herein, the singular forms “a,” “an,” and “the” include plural references unless the context clearly indicates otherwise. Thus, for example, reference to “a precursor” includes a single precursor as well as a mixture of two or more precursors; and reference to a “reactant” includes a single reactant as well as a mixture of two or more reactants, and the like.

Reference throughout this specification to “one embodiment” or “an embodiment” means that a particular feature, structure, or characteristic described in connection with the embodiment is included in at least one embodiment. Thus, the appearances of the phrase “in one embodiment” or “in an embodiment” in various places throughout this specification are not necessarily all referring to the same embodiment. In addition, the term “or” is intended to mean an inclusive “or” rather than an exclusive “or.” When the term “about” or “approximately” is used herein, this is intended to mean that the nominal value presented is precise within ±10%, such that “about 10” would include from 9 to 11.

The term “at least about” in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term “at least about” includes the recited number minus 10% and any quantity that is higher such that “at least about 10” would include 9 and anything greater than 9. This term can also be expressed as “about 10 or more.” Similarly, the term “less than about” typically includes the recited number plus 10% and any quantity that is lower such that “less than about 10” would include 11 and anything less than 11. This term can also be expressed as “about 10 or less.”

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to illuminate certain materials and methods and does not pose a limitation on scope. No language in the specification should be construed as indicating any non-claimed element as essential to the practice of the disclosed materials and methods.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Table of Elements

| Element Identifier | Description |
|---|---|
| 1 | Actuator body |
| 2 | Nozzle |
| 3 | Plug |
| 4 | Limit rod |
| 5 | Spring |
| 6 | Sealing ring |
| 7 | First end of plug |
| 8 | Second end of plug |
| 9 | Protrusion |
| 10 | First end of spring |
| 11 | Discharge cavity |
| 12 | Inner annular wall |
| 13 | Guide groove |
| 14 | Second end of spring |
| 15 | Opening |
| 16 | Outer peripheral wall |
| 17 | Base |
| 18 | Internal wall |
| 19 | Outlet |
| 20 | Constricted end |
| 21 | Reinforcement |
| 22 | Discharge port |
| 23 | Mid-section of plug |
| 24 | End wall of discharge cavity |
| 31 | Fluid guiding groove |
| 32 | Tapered groove |
| 32a | First slope surface |
| 32b | First stop surface |
| 41 | Shaped end portion |
| 41a | Second slope surface |
| 41b | Second stop surface |
| 41c | Discharge hole |
| 41d | Discharge channel |
| 42 | Rod body |
| 43 | Stop plate |
| 44 | Flange |
| 100 | Actuator |
| 200 | Collar |
| 300 | Pump body assembly |

What is claimed is:

1. A self-sealing pressing and discharging actuator, which is fixedly connected to a pump body assembly and comprises a use state as a directional reference, the actuator comprising:

an actuator body with a discharge cavity inside;

a nozzle connecting the discharge cavity with an external atmosphere is connected to a side end surface of the actuator body;

a plug positioned in the discharge cavity, wherein an end of the pump body assembly is connected to a limit rod, a central axis of which is perpendicular to a central axis of the plug, wherein the limit rod is in communication with an inside of the pump body assembly and an inside of the nozzle, wherein an end of the limit rod is slidingly connected to a tapered surface of the plug enabling the plug to elastically stretch and slide along an axial direction of the nozzle, wherein the plug has an avoidance state for opening the nozzle and a blocking state for closing the nozzle, wherein a middle section of the plug corresponding to the limit rod is formed with a connection comprising the discharge cavity, wherein a tapered groove is formed on a tapered groove of the plug with a first tapered surface and a first stop surface, wherein the limit rod is formed at the corresponding tapered groove and there is a tapered plane protrusion connecting the inside of the limit rod and an outside of limit rod, wherein a second tapered plane and a second stop surface are formed on the tapered plane protrusion, wherein the first tapered plane is along a first plane, the two tapered surfaces being slidably matched such that the first stop surface stops at the second stop surface, so that the blocking has an avoidance state, wherein an inner annular wall is formed on the actuator body and is located below the discharge cavity in the axial direction of the actuator body, a guide groove being provided on the inner annular wall corresponding to flange in the axial direction, the flange being slidably fitted in the guide groove, and wherein the limit rod is inserted in the inner annular wall at the upper section above the stop plate, and wherein an inner channel of an inner ring is sealed with an inner surface of the inner annular wall via a sealing ring.

2. A push pump comprising the actuator according to claim 1.

3. A self-sealing pump, comprising:

an actuator comprising:

a nozzle configured to attach to an actuator body, the actuator body comprising at least one inner annular wall extending radially inward from the actuator body, wherein the inner annular wall defines a discharge cavity;

a plug configured to slidingly seat within the nozzle and the discharge cavity, wherein the plug comprises a first end having one or more fluid guiding grooves and a second end comprising a protrusion, the plug further comprising a mid-section having a tapered groove;

a spring configured to coaxially mate with the protrusion and to seat against an internal surface of the actuator body;

a limit rod comprising a shaped end portion configured to slidingly engage with the tapered groove, wherein the limit rod is configured to extend through the inner annular wall, the limit rod further comprising an inner channel in communication with the discharge cavity via a discharge hole positioned within the shaped end;

a sealing ring configured to form a seal between the limit rod and the inner annular wall; and a stop plate attached to and extending radially outward from the limit rod, the stop plate received within the actuator housing; and a reservoir, wherein the actuator is removably attached to the reservoir, wherein, upon actuation, the actuator is configured to move in a first direction perpendicularly to the nozzle, which opens a passage from the reservoir through the inner channel and discharge hole into the discharge cavity along the one or more fluid guiding grooves and through an outlet of the nozzle, and upon de-actuation, the actuator is configured to close the passage.

4. The self-sealing pump according to claim 3, wherein movement of the limit rod within the tapered groove slides the plug in an axial direction upon actuation and de-actuation.

5. The self-sealing pump according to claim 3, wherein the one or more fluid guiding grooves are arranged in the axial direction of the plug and are formed on a circumferential surface of the plug proximate an outlet of the nozzle.

6. The self-sealing pump according to claim 3, further comprising at least one clamping rib arranged in an axial direction of the plug and formed on a circumferential surface of the nozzle, wherein the clamping rib is configured to claim in the one or more fluid guiding grooves to limit circumferential movement of the nozzle.

7. The self-sealing pump according to claim 3, wherein the tapered groove comprises a first tapered surface and a first stop surface and the shaped end of the limit rod comprises a second tapered surface and a second stop surface, and wherein the first tapered surface and the second tapered surface are configured to slidably contact such that the first stop surface is configured to stop at the second stop surface to open the inner channel to the discharge cavity.

8. The self-sealing pump according to claim 3, further comprising a flange extending radially outward from the limit rod, the flange being positioned above the stop plate, wherein the actuator body is configured to move up and down along the flange and to stop at the stop plate.

9. The self-sealing pump according to claim 7, wherein the inner annular wall comprises a guide groove configured to slidably engage with the flange.

10. The self-sealing pump according to claim 3, wherein the nozzle further comprises an outlet in communication with the discharge cavity via the one or more fluid guiding grooves.

11. The self-sealing pump according to claim 3, wherein the spring is positioned such that, upon actuation, movement of the plug compresses the spring against the internal surface and opens the outlet, and upon de-actuation, the spring elongates to move the plug back to the nozzle thereby blocking the outlet.

12. The self-sealing pump according to claim 3, wherein one or more of the nozzle, actuator body, at least one inner annular wall, plug, spring, limit rod, sealing ring, stop plate or reservoir comprises a metal, plastic, ceramic or combination of two or more thereof.

13. The self-sealing pump according to claim 3, wherein one or more of the nozzle, actuator body, at least one inner annular wall, plug, spring, limit rod, sealing ring, stop plate or reservoir comprises a sustainable material selected from the group consisting of a biodegradable polymer, polyethylene, polypropylene, ethylene vinyl alcohol, nylon or combinations of two or more thereof.

14. The self-sealing pump according to claim 3, wherein the reservoir comprises a fluid selected from the group consisting of a liquid, slurry, viscous liquid, paste, Bingham plastic, cosmetic, dentifrice, household cleaner, personal care product, moisturizer, sun screen, serum, cream, lotion, gel, lip color, lip moisturizer, lip gloss, blush, foundation, liquid foundation, shampoo, conditioner, eyeliner, eye shadow, deodorant, antiperspirant, perfume, surface cleaner, wood cleaner, glass cleaner, metal cleaner, stone cleaner, wood moisturizer, surface disinfectant, surface duster, surface fragrance and combinations of any two or more thereof.

* * * * *